US006033123A

United States Patent [19]

Sato et al.

[11] Patent Number: 6,033,123

[45] Date of Patent: Mar. 7, 2000

[54] TAPERED ROLLER BEARING

[75] Inventors: Yukio Sato; Tetsu Takehara, both of Kanagawa, Japan

[73] Assignee: NSK Ltd., Tokyo, Japan

[21] Appl. No.: 09/154,824

[22] Filed: Sep. 17, 1998

[30] Foreign Application Priority Data

Sep. 22, 1997 [JP] Japan .................................... 9-273295

[51] Int. Cl.[7] ...................................................... F16C 33/36

[52] U.S. Cl. ............................................................ 384/571

[58] Field of Search .................................... 384/450, 571, 384/564

[56] References Cited

U.S. PATENT DOCUMENTS

| | | | |
|---|---|---|---|
| 1,727,576 | 9/1929 | Umstattd | 384/571 |
| 1,784,914 | 12/1930 | Strickland et al. | 384/475 |
| 1,894,099 | 1/1933 | Johnston | 384/571 |
| 3,995,920 | 12/1976 | Bucha | 384/571 |
| 4,877,340 | 10/1989 | Hoeprich | 384/571 |
| 5,007,747 | 4/1991 | Takeuchi et al. | 384/450 |

FOREIGN PATENT DOCUMENTS

| | | |
|---|---|---|
| 4-331813 | 11/1992 | Japan . |
| 5-87330 | 11/1993 | Japan . |
| 6-8815 | 2/1994 | Japan . |
| 7-40729 | 9/1995 | Japan . |

*Primary Examiner*—Thomas R. Hannon
*Attorney, Agent, or Firm*—Sughrue, Mion, Zinn Macpeak & Seas, PLLC

[57] ABSTRACT

An inner ring of a tapered roller bearing is provided with an groove-like recess formed between an outer race surface and a large rib surface. A Chamfer is provided between a large-diameter-side end surface and a rolling surface in each tapered roller. (1) The height from the outer race surface of the inner ring to a contact position where the inner ring large rib surface contacts with the large-diameter-side end surface of each roller is set to be 6 to 9.5% of the diameter of the roller large-diameter-side end surface. (2) The chamfer of the large-diameter-side end surface of each roller is set to be 30 to 60% of the contact position height. In addition, (3) the size of the recess in the large rib surface side of the inner ring is set to be not larger than 75% of the chamfer of the large-diameter-side end surface of each roller.

3 Claims, 8 Drawing Sheets

TAPERED ROLLER BEARING

BACKGROUND OF THE INVENTION

The present invention relates to a tapered roller bearing used in a driving unit of a rolling mill or a railway vehicle. Particularly, the present invention relates to an improvement in prevention of seizure between a large rib surface and roller large-diameter-side end surfaces of a tapered roller bearing used as a thrust bearing of a rolling mill operating at a high rotating velocity, a pinion of a driving unit of a railway vehicle, or the like.

Conventionally, tapered roller bearings have been used for thrust bearings of rolling mills, driving unit pinion bearings of railway vehicles, and so on.

FIG. 4 and FIG. 5 are conceptual diagrams showing a contact state between a large rib surface 2*a* of an inner ring 2 and a large-diameter-side end surface 3*a* of a roller 3 in a tapered roller bearing. When an axial load acts on the tapered roller bearing (see the arrows Fa in FIG. 1), the load is partially given to the large-diameter-side end surface 3*a* of the roller 3 and the large rib surface 2*a* of the inner ring. As a result, pressure distribution as shown in FIG. 6 is produced in a contact ellipse 32 in a contact position ($e_0$) where the large rib surface 2*a* of the inner ring contacts with the large-diameter-side end surface of the roller 3 as shown in FIG. 5.

Note that in FIG. 6, a designates a long diameter of a contact ellipse between the inner ring large rib surface and the roller large-diameter-side end surface, and also b denotes a short diameter of the contact ellipse between the inner ring large rib surface and the roller large-diameter-side end surface.

In addition, there is a difference in velocity between the inner ring 2 and the roller 3 at the contact position ($e_0$) where the large rib surface 2*a* of the inner ring 2 contacts with the large-diameter-side end surface of the roller 3.

On the assumption that there is no slip in a plane where a race surface (so called as a race track) of the inner ring contacts with a rolling surface of the roller, the relative velocity ($V_i$) between the circumferential velocity (X) of the race surface of the inner ring and the revolution velocity (Y) of the roller on the race surface of the inner ring is equal to the circumferential rotation velocity ($V_R$) of the rolling surface of the roller. However, the contact position circumferential velocity ($V_i'$) of the inner ring large rib surface is larger than the contact position circumferential velocity ($V_R'$) of the roller large-diameter-side end surface, so that such a slip as represented by (Vs) in FIG. 7 is generated.

Note that the above-mentioned the circumferential velocity (X) of the race surface of the inner ring, the revolution velocity (Y) of the roller on the race surface of the inner ring, the relative velocity ($V_i$) between the circumferential velocity (X) and the revolution velocity (Y), the circumferential rotation velocity ($V_R$) of the rolling surface of the roller, the contact position circumferential velocity ($V_i'$) of the inner ring large rib surface, the contact position circumferential velocity ($V_R'$) of the roller large-diameter-side end surface, and the slip velocity (Vs) of the slippage respectively satisfy following equations(1)–(8):

$$X=r_i\cdot\omega_i \quad (1)$$

$$Y=r_i\cdot\omega_c \quad (2)$$

$$Vi=r_i(\omega_i-\omega_c) \quad (3)$$

$$V_R=r_R\cdot\omega_R \quad (4)$$

$$Vi=V_R \quad (5)$$

$$Vi'=(r_i+e)\cdot(\omega_i-\omega_c) \quad (6)$$

$$V_R'=(r_R+e)\cdot\omega_R \quad (7)$$

$$Vs=Vi'-V_R \quad (8)$$

where $e_0$ expresses a contact point between the inner ring large rib surface and a roller large-diameter-side end surface; e defines a contact position height; $r_i$ denotes a radius of an race surface of a large diameter portion of the inner ring; $r_R$ defines a radius on the large diameter side of the roller; 107 $_i$ expresses an angular velocity of the inner ring; $\omega_c$ defines revolution angular velocity of the roller; and $\omega_R$ denotes rotation angular velocity of the roller.

When the bearing pressure or the slip velocity increased in this contact position ($e_0$), there was a case where seizure was caused in the position in accordance with state of lubrication. When this position was seized, a smooth rotating function of the bearing was spoiled, it might occasionally cause a trouble on the whole of a mechanical equipment. Therefore, in order to cope with this problem, there have been taken such measures that the state of lubrication is improved, the pressure in the contact plane is reduced, or the slip velocity at the contact position is reduced.

However, in the conventional tapered roller bearing, a large space was required by a groove-like recess 21 in the inner ring large rib as shown in FIG. 8 or a large-diameter-side end surface chamfer C1 of the roller 3 as shown in FIG. 9. Accordingly, if the area of the contact ellipse was increased to reduce the bearing pressure to a small value, a lower (inner ring orbit side) contact ellipse 32 at the contact position ($e_0$) expanded to the groove-like recess 21 of the inner ring large rib, thereby causing a problem that a peak of the bearing pressure was generated at the circumferential edge of the groove-like recess, or, if the contact position ($e_0$) is shifted to a higher place in order to prevent the peak generation, the slip velocity Vs increases.

In addition, the groove-like recess 21 in the inner ring large rib surface 2*a* has a connection with the strength of the large rib surface 2*a*. If the recess 21 is made extremely small, stress concentration is caused. It is therefore necessary to make the recess 21 have an enough size not to reduce the strength of the large rib surface 2*a*. Even if the recess 21 of the inner ring large rib is made as small as possible, if the chamfer (C1) of the large-diameter-side end surface of the roller is left large as it is, the contact ellipse 32 projects from the chamfer (C1) of the large-diameter-side end surface of the roller in the same manner as described above, so that a peak of the bearing pressure is generated at the circumferential edge of the chamfer of the roller.

SUMMARY OF THE INVENTION

It is therefore an object of the present invention to reduce the recess height (f) of an inner ring large rib surface and the chamfer (C1) of a large-diameter-side end surface of each roller to a size within a range where the strength is not lowered and work can be carried out to thereby reduce the height (e) from an inner ring race surface to a contact position ($e_0$) between the inner ring large rib surface 2*a* and the large-diameter-side end surface of the roller (hereinafter simply referred to as “contact position height”) to reduce the slip velocity in the contact position to a small value.

According to the present invention, provided is a tapered roller bearing comprises: an inner ring having a large diameter portion, a small diameter portion, a large rib surface formed in the large diameter portion, a small rib surface formed in the small diameter portion, a tapered outer race surface connecting the large and small diameter portions to each other, and a groove-like recess formed between the outer race surface and the large rib surface; an outer ring having a tapered inner race surface facing the outer race surface; a plurality of tapered rollers each of which has a large-diameter-side end surface, a small-diameter-side end surface, a rolling surface constituted by a tapered circumferential surface connecting the large-diameter-side end surface and the small-diameter-side end surface to each other, and a chamfer formed between the large-diameter-side end surface and the rolling surface, and each of which is disposed between the inner ring and the outer ring so that the rolling surface contacts with the outer race surface of the inner ring and the inner race surface of the outer ring, and the large-diameter-side end surface contacts with the large rib surface of the inner ring; and a retainer for holding the plurality of tapered rollers; characterized in that: (1) the height of the contact position where the large rib surface of the inner ring and the large-diameter-side end surfaces of the rollers, from the outer race surface of the inner ring, is set to be 6 to 9.5% of the diameter of the large-diameter-side end surface of each of the rollers; (2) the chamfer in the large-diameter-side end surface of each of the rollers is set to be 30 to 60% of the contact position height; and (3) the size of the recess in the large rib surface of the inner ring is set to a value not larger than 75% of the chamfer in the large-diameter-side end surface of each of the rollers.

DETAILED DESCRIPTION OF THE PREFERRED EMBODIMENTS

Hereinafter a preferred embodiments according to the present invention will be explained with reference to attached drawings.

Figure 1:
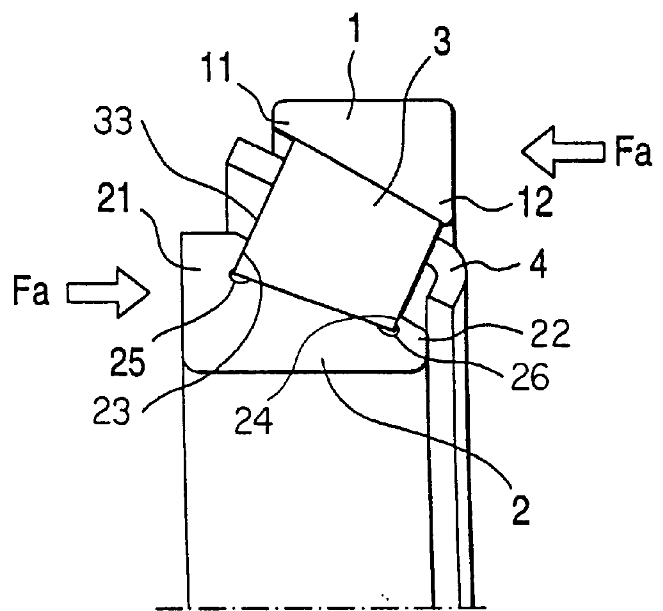
FIG. 1 shows a partially longitudinally sectional expanded a view of a first embodiment of the present invention.
Figure 2:
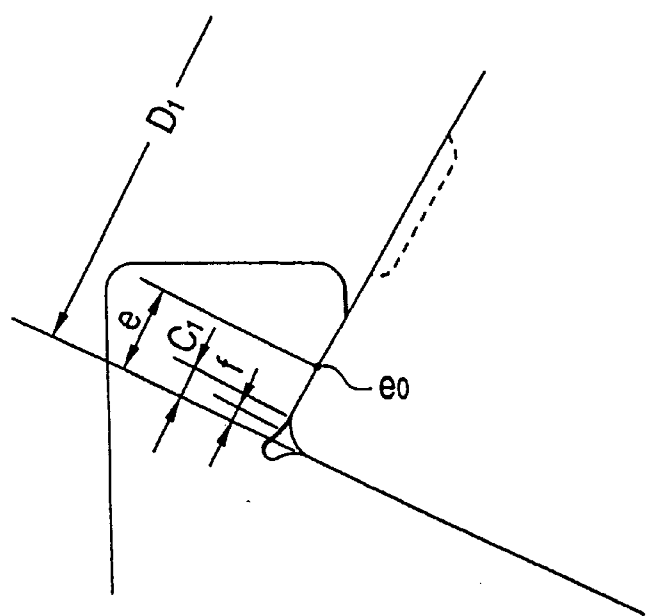
FIG. 2 shows a longitudinally sectional expanded view of the first embodiment.

FIG. 1 shows a tapered roller bearing which is an embodiment of the present invention. In FIG. 1, the tapered roller bearing has an outer ring 1, an inner ring 2, a plurality of rollers 3 interposed between the outer and inner rings, and a retainer 4 holding these rollers 3.

The inner ring 2 has a large-diameter portion 21 and a small diameter portion 22. The large diameter portion 21 is provided with a large rib surface 23, and the small diameter portion 22 is provided with a small rib surface 24. An outer race surface forming a part of a tapered shape is provided between the large rib surface 23 and the small rib surface 24. Groove-like recesses 25 and 26 are formed between the respective large and small rib surfaces 23 and 24 and the outer race surface.

The outer ring 1 has a large diameter portion 11 and a small diameter portion 12. An inner race surface forming a part of the tapered shape is provided between the large and small diameter portions 11 and 12 so as to be in opposition to the outer race surface of the inner ring 2.

Each of the rollers 3 has a large-diameter-side end surface 33 and a small-diameter-side end surface 34. A rolling surface 35 is a tapered circumferential surface connecting the large-diameter-side end surface 33 and the small-diameter-side end surface 34 to each other and forms a part of the tapered shape. Chamfers 36 and 37 are formed between the rolling surface 35 and the respective large-diameter-side and small-diameter-side end surfaces 33 and 34.

The size of the chamfer in the large-diameter-side end surface is C1, while the size of the chamfer in the large-diameter-side rolling surface is C2. The chamfer size C1 of the large diameter side is made to be a question in the present invention.

The rollers 3 contact at their rolling surfaces 35 with the outer race surface of the inner ring 2. At the same time, when an axial load Fa is applied as shown in FIG. 1, at least the large-diameter-side end surfaces 33 of the rollers 3 contact with the large rib surface 23 of the inner ring 2.

In this embodiment, when the thrust load Fa is applied to the bearing as shown in FIG. 1, it is possible to reduce the slip velocity to a low value because a contact position ($e_0$) where the large rib surface 23 of the inner ring 2 contacts with the large-diameter-side end surface 33 of each roller 3 is set to a position which is 6 to 9.5% of the large-diameter-side diameter (D1) of the roller 3.

In addition, the chamfer (C1) of the large-diameter-side end surface of each roller 3 is set to a small value which is 30 to 60% of the contact position height (e) of the large rib surface 2*a* of the inner ring 2, and the recess height (f) of the large rib surface 2*a* of the inner ring is set to be 75% or less of the chamfer (C1) of the large-diameter-side end surface of the roller. Accordingly, the resistance against seizure of the inner ring large rib surface 2*a* is improved largely. In addition, the lower limit of the recess height (f) of the large rib 2*a* is defined suitably so as not to cause stress concentration in working, taking grinding or the like into consideration.

Note that when the chamfer (C1) of the large-diameter-side end surface of each roller 3 is set to be less than 30% of the contact position height (e) of the large rib surface 2*a* of the inner ring 2, the recess height (f) of the large rib surface 2*a* of the inner ring becomes too small to machine the same. In addition, if the chamfer (C1) is set to be more than 60%, it becomes easy to expose a shorter diameter (b) of the contact ellipse between the inner ring large rib surface and the roller large-diameter-side end surface from the chamfer.

Figure 3:
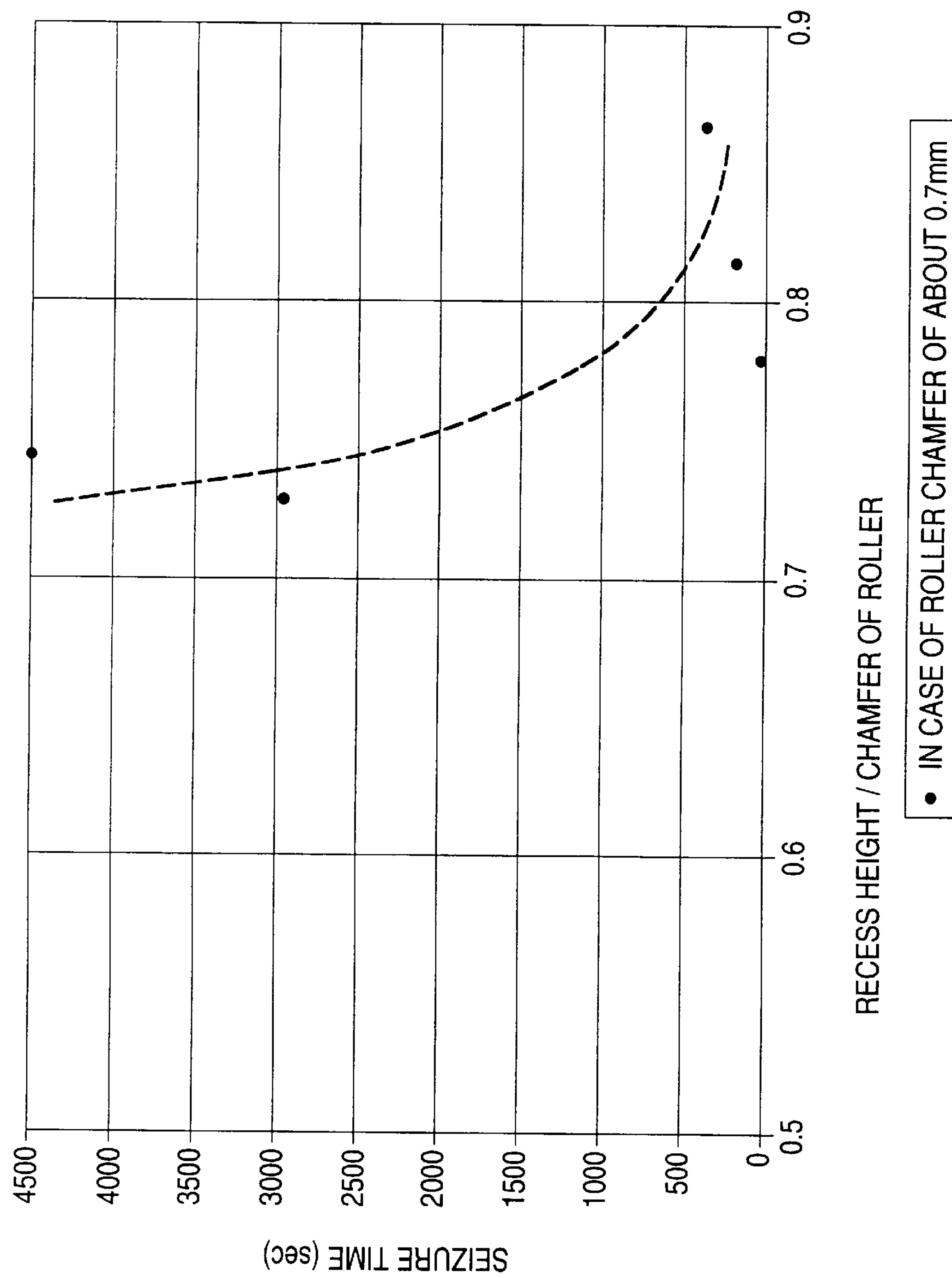
FIG. 3 shows a graph showing seizure time of a tapered roller bearing with respect to the ratio of the recess height (f) on the large rib surface side of the inner ring to the chamfer (C1) of the large-diameter-side end surfaces of each roller.
Figure 4:
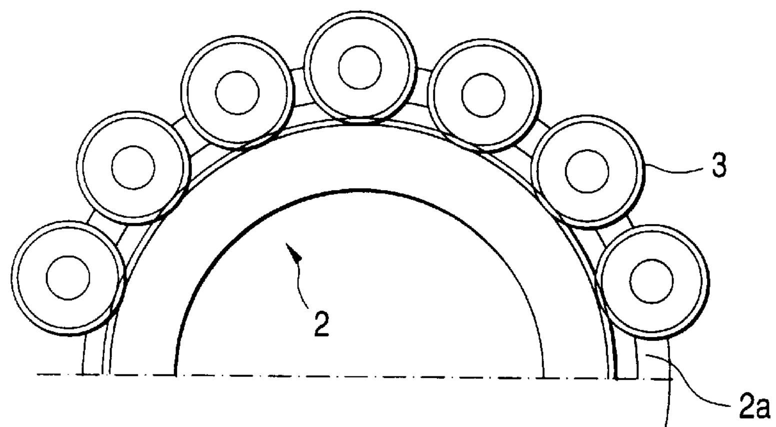
FIG. 4 shows a conceptual diagram illustrating a contacting state between the inner ring large rib surface and the large-diameter-side end surfaces of the respective rollers.
Figure 5:
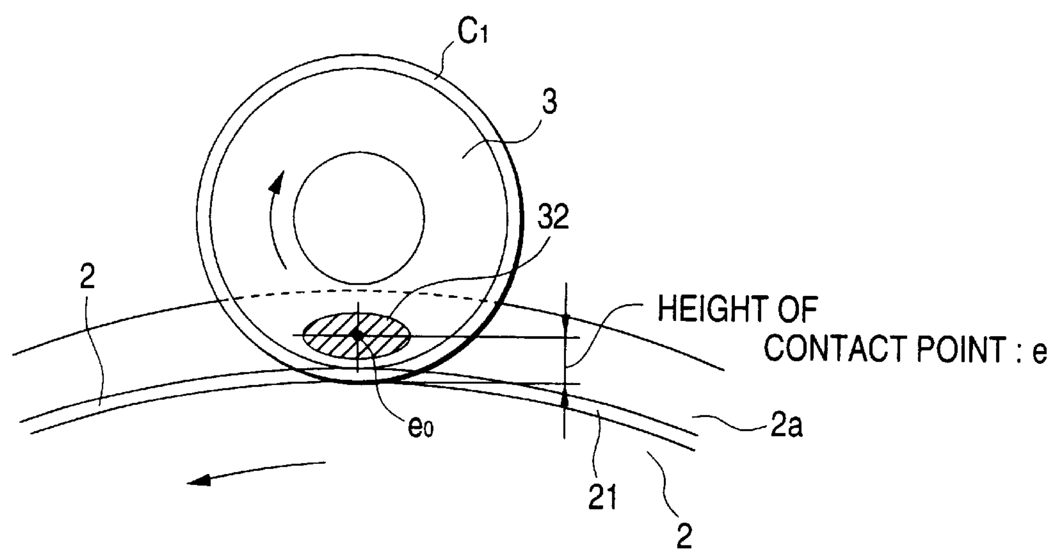
FIG. 5 shows a conceptual diagram similar to FIG. 4, in which one roller is illustrated.
Figure 6:
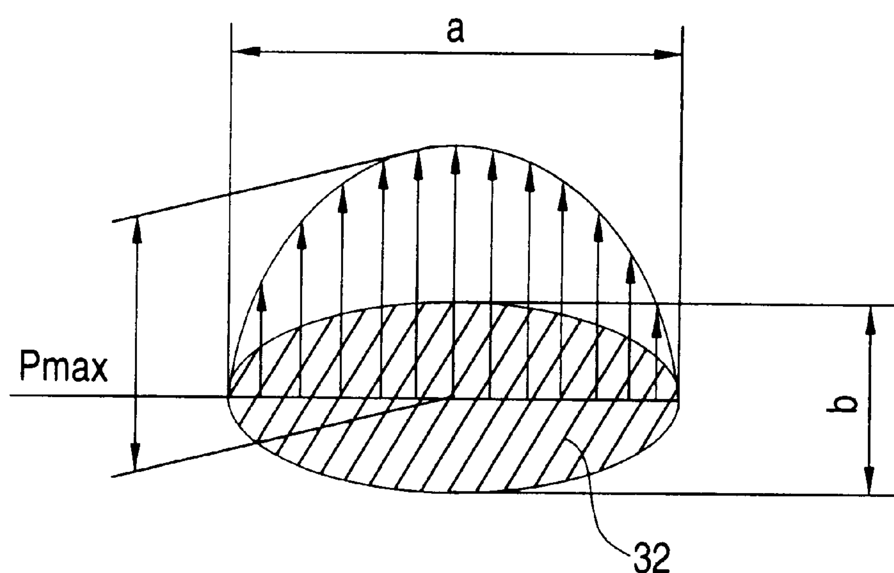
FIG. 6 shows a diagram showing a bearing pressure distribution in a contact ellipse between the large rib surface of the inner ring and the large-diameter-side end surface of the roller.
Figure 7:
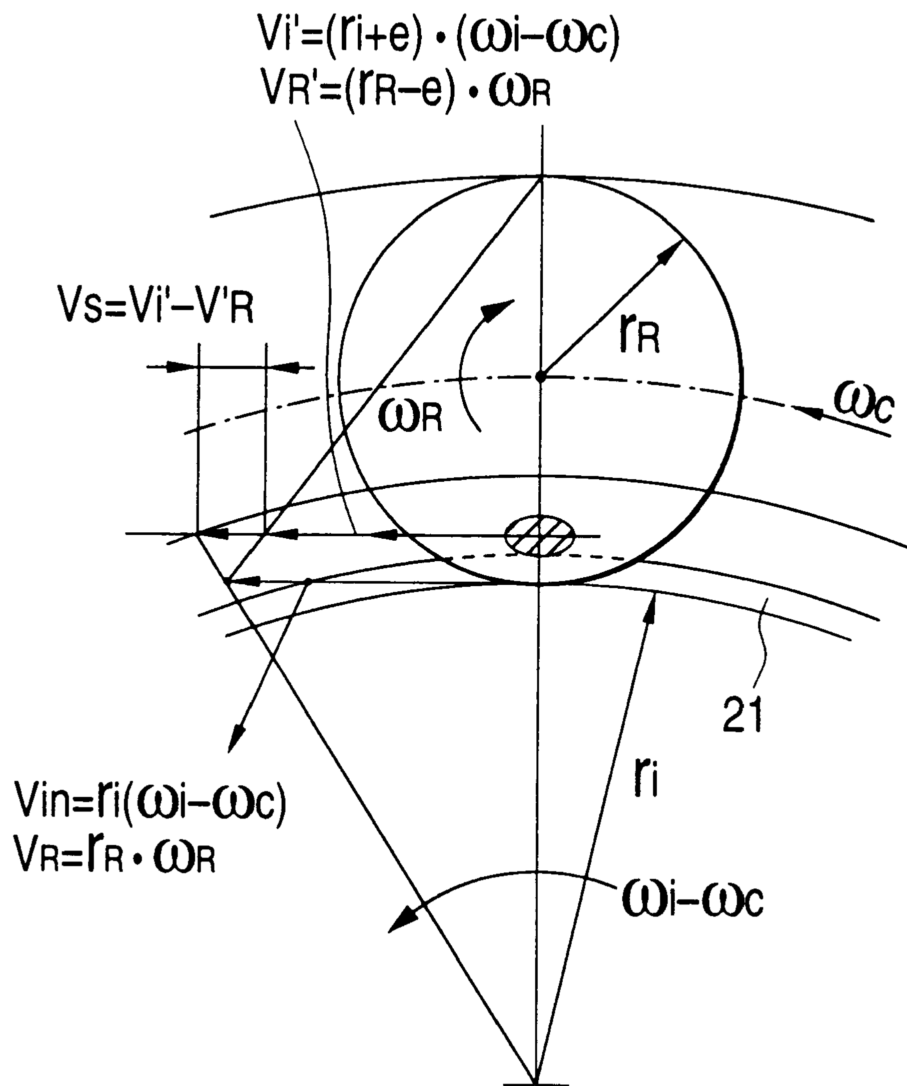
FIG. 7 shows a conceptual diagram of a slip velocity in a contact point position.
Figure 8:
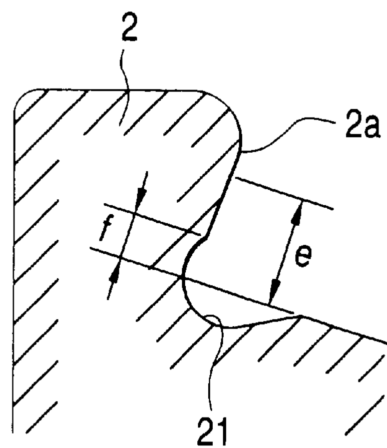
FIG. 8 shows a detailed diagram of a groove-like recess of the inner ring large rib surface.
Figure 9:
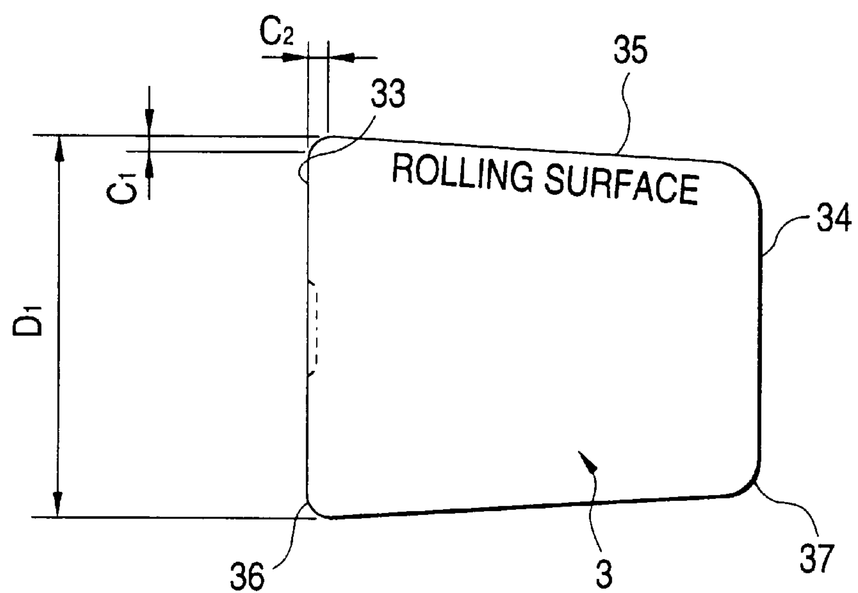
FIG. 9 shows an explanatory diagram of the whole of the roller.
Figure 10:
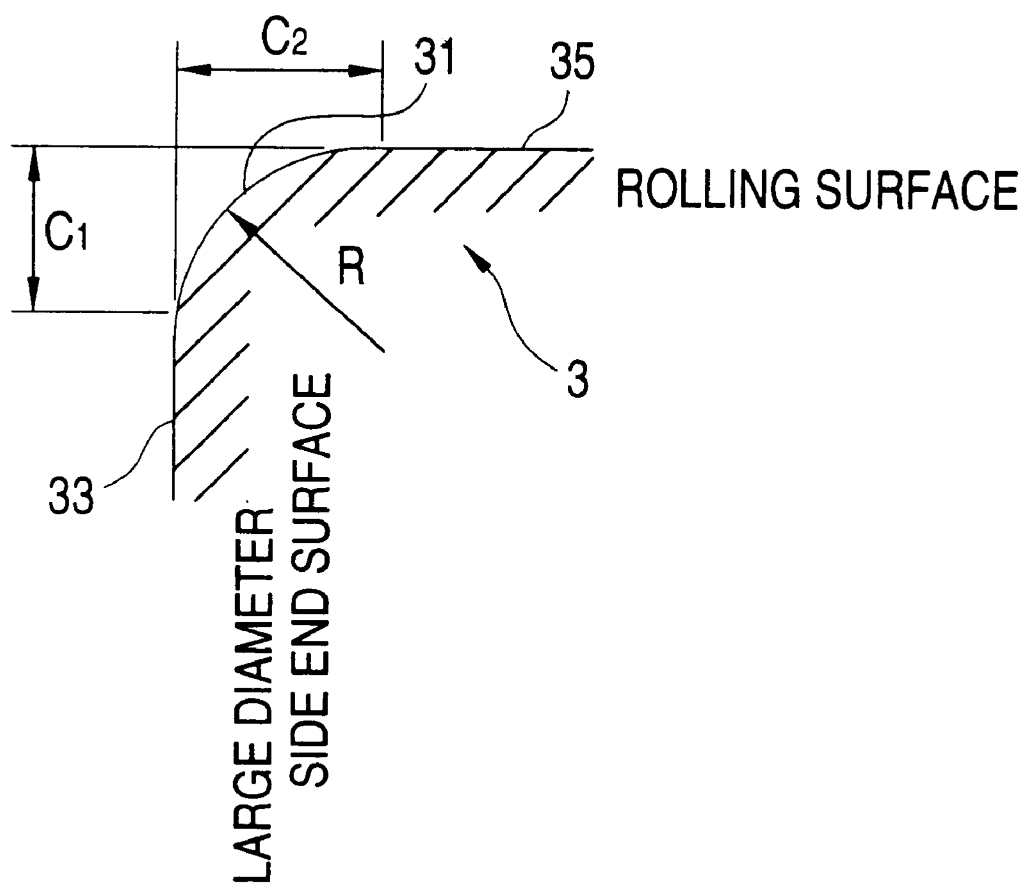
FIG. 10 shows a detailed diagram of a chamfered portion of the large-diameter-side end surface of the roller.

FIG. 3 is a graph showing seizure time with respect to the ratio of the recess height (f) on the side of the inner ring large rib surface to the chamfer (C1) of the large-diameter-side end surface of each roller 3, in a tapered roller bearing in which the chamfer (C1) of the large-diameter-side end surface 2*a* of each roller is about 0.7 mm, and the chamfer (C1) of the large-diameter-side end surface of each roller is set to be 40% of the contact position height (e) of the inner ring large rib surface 2*a*. As shown in FIG. 3, the proper value of the recess height (f) of the inner ring large rib surface of the bearing in which the roller large-diameter-side end surface chamfer (C1) is set to be 40% of the contact position height (e) of the inner ring large rib surface is not more than 75% of the roller large-diameter-side end-surface chamfer (C1), so that the seizure time becomes longer on a large scale. It is therefore understood that the resistance against seizure has been improved.

Figure 11:
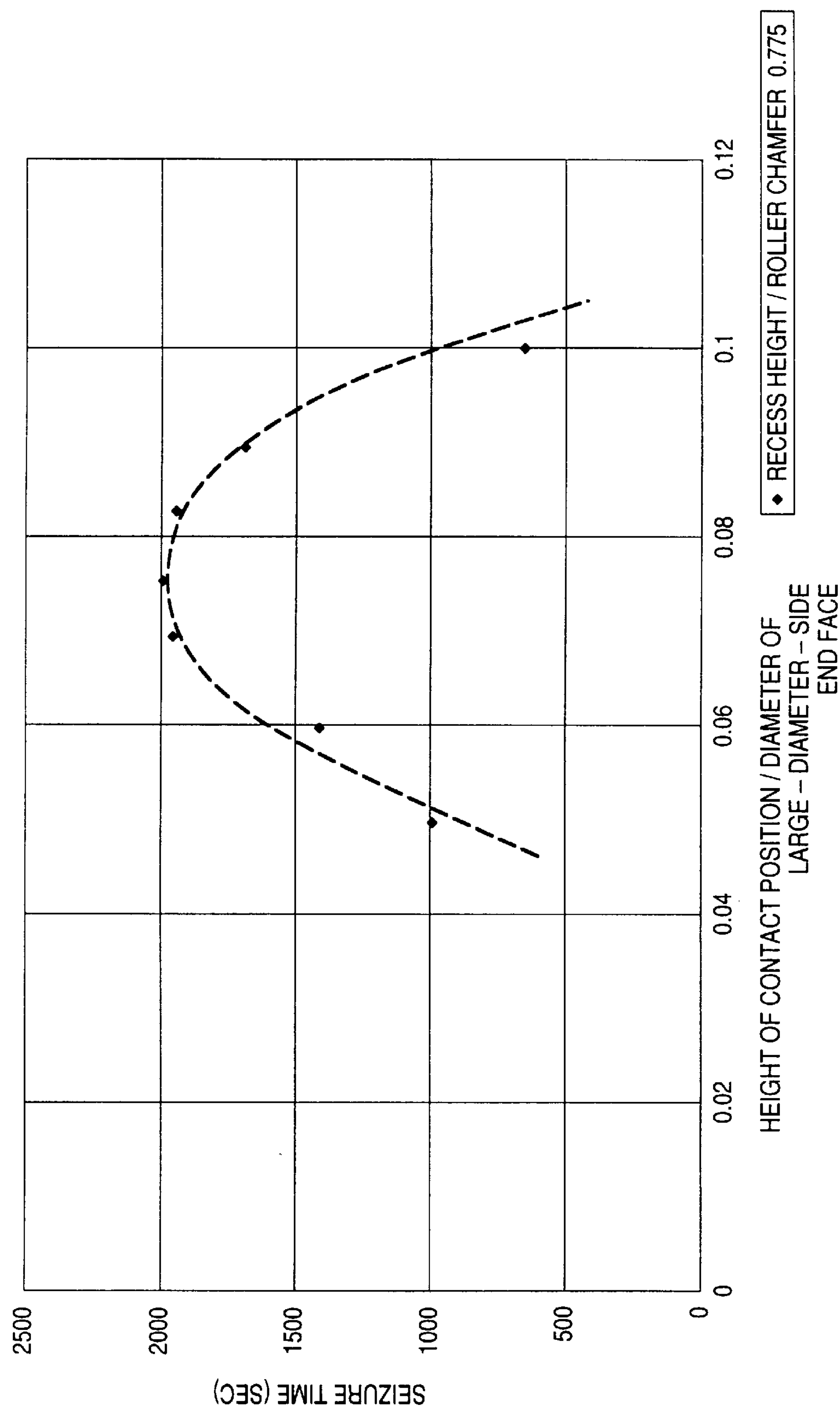
FIG. 11 is a graph showing seizure time with respect to the ratio of a contact position height of the inner ring larder rib surface and a diameter of the large-diameter-side end surface of each roller.

FIG. 11 is a graph showing seizure time with respect to the ratio of a contact position height (e) of the inner ring larder rib surface 2*a* and a diameter of the large-diameter-side end surface of each roller under a condition that a ratio of the recess height (f) of the inner ring large rib surface of the bearing to the chamfer (C1) of the large-diameter-side end surface of each roller 3 is set to be 0.775. As clearly shown in FIG. 11, a height of the contact position where the large rib surface of the inner ring and the large-diameter-side end surfaces of the rollers, from said outer race surface of the inner ring, is set to be 6 to 9.5%, preferably 6.5 to 8.5%, more preferably 7–8% of the diameter of the large-diameter-side end surface of each of the rollers.

According to the present invention, the contact position ($e_0$) of the large rib surface of the inner ring where the large rib surface contacts with a large-diameter-side end surface of each roller is set to be low, and the chamfer of the large-diameter-side end surface of each roller is made small, but also the recess height (f) of the large rib surface of the inner ring is set to be an optimum value for the resistance against seizure. Accordingly, the slip velocity in the contact position ($e_0$) is reduced, and the resistance against seizure is improved on a large scale. It is therefore possible to obtain high reliability against seizure.

In addition, there is an effect that a tapered roller bearing according to the present invention is applicable to a rotation velocity as well as an axial loading condition each of which exceeds a conventional limit.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A tapered roller bearing comprising:

an inner ring (2) having a large diameter portion (21), a small diameter portion (22), a large rib surface (23) formed in said large diameter portion, a small rib surface (24) formed in said small diameter portion, a tapered outer race surface connecting said large and small diameter portions to each other, and a groove-like recess (25, 26) formed between said outer race surface and said large rib surface;

an outer ring (1) having a tapered inner race surface facing said outer race surface;

a plurality of tapered rollers (3) each of which has a large-diameter-side end surface (33), a small-diameter-side end surface (34), a rolling surface (35) constituted by a tapered circumferential surface connecting said large-diameter-side end surface and said small-diameter-side end surface to each other, and a chamfer (36, 37) formed between said large-diameter-side end surface and said rolling surface, and each of which is disposed between said inner ring and said outer ring so that said rolling surface contacts with said outer race surface of said inner ring and said inner race surface of said outer ring, and said large-diameter-side end surface contacts with said large rib surface of said inner ring; and a retainer for holding said plurality of tapered rollers;

where in a height of the contact position where said large rib surface of said inner ring and said large-diameter-side end surfaces of said rollers, from said outer race surface of said inner ring, is set to be 6 to 9.5% of the diameter of said large-diameter-side end surface of each of said rollers, wherein said chamfer formed on said large-diameter-side end surface of each of said rollers is set to be 30 to 60% of said contact position height, and wherein the size of said recess in said large rib surface of said inner ring is set to a value not larger than 75% of said chamfer in said large-diameter-side end surface of each of said rollers.

2. The tapered roller bearing according to claim 1, in which said height of the contact position is set to be 6.5 to 8.5% of the diameter of said large-diameter-side end surface of each of said rollers.

3. The tapered roller bearing according to claim 1, in which said height of the contact position is set to be 7 to 8% of the diameter of said large-diameter-side end surface of each of said rollers.

* * * * *